United States Patent
Casas

(10) Patent No.: US 12,019,686 B2
(45) Date of Patent: *Jun. 25, 2024

(54) DOCUMENT RETRIEVAL AND PROCESSING FROM ONLINE DATABASES USING THUMBNAIL IMAGE INDEXING BASED ON USER AND DATA TYPE

(71) Applicant: Gregory J Casas, Austin, TX (US)

(72) Inventor: Gregory J Casas, Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/897,701

(22) Filed: Aug. 29, 2022

(65) Prior Publication Data
US 2023/0066506 A1 Mar. 2, 2023

Related U.S. Application Data

(63) Continuation-in-part of application No. 17/064,137, filed on Oct. 6, 2020, now Pat. No. 11,429,782.

(60) Provisional application No. 62/913,641, filed on Oct. 10, 2019.

(51) Int. Cl.
*G06F 16/93* (2019.01)
*G06F 16/903* (2019.01)
*G06F 16/9538* (2019.01)

(52) U.S. Cl.
CPC ........ *G06F 16/90335* (2019.01); *G06F 16/93* (2019.01); *G06F 16/9538* (2019.01)

(58) Field of Classification Search
CPC . G06F 16/90335; G06F 16/93; G06F 16/9538
See application file for complete search history.

(56) References Cited

U.S. PATENT DOCUMENTS

| | | | |
|---|---|---|---|
| 2003/0169286 A1* | 9/2003 | Misawa | G09G 5/00 386/E5.072 |
| 2008/0129757 A1* | 6/2008 | Tanaka | G06F 16/54 345/660 |
| 2009/0249446 A1* | 10/2009 | Jenkins | G06F 9/451 707/E17.108 |
| 2011/0145753 A1* | 6/2011 | Prakash | G06F 3/04812 715/783 |
| 2011/0191211 A1* | 8/2011 | Lin | G06F 16/951 707/706 |
| 2012/0221555 A1* | 8/2012 | Byrne | G06F 16/951 707/723 |
| 2016/0063067 A1* | 3/2016 | Maitra | G06F 16/435 707/769 |

* cited by examiner

*Primary Examiner* — Keith D Bloomquist
(74) *Attorney, Agent, or Firm* — Staniford Tomita LLP

(57) ABSTRACT

Embodiments are described for a comprehensive and real-time document sharing, editing, analyzing, coding, and processing platform using online databases. The system includes a data storage and retrieval process as well as a graphical user interface (GUI) component that displays small graphical representations of documents or file elements, referred to as "thumbnail" images to provide a quick recognizable reference to a document, as well as a link to the document or file itself. User access control determines whether a searching user can access a document based on the user role and context of the document. A real-time collaboration component allows various disparate users to access the same document and simultaneously make notes and changes as well as see other notes and changes made by other users.

20 Claims, 9 Drawing Sheets

SEARCH PAGE 400

ENTER SEARCH TERM: 402

RESULT 1

404

D:/Contracts/NDA_1
2018:12:02:15:45:22
NY_15674_JCY

406

RESULT 2

D:/Contracts/NDA_4
2018:05:26:16:25:54
CA_45968_GCS

RESULT 3

D:/ARCHIVE/NDA
2015:10:04:12:10:04
235938_BVE_685

FIG. 4

| THUMBNAIL | DOC ID | CODED KEY TERMS | NOTES |
|---|---|---|---|
| 501 / 502 | D:/Contracts/NDA_1<br>2018:12:02:15:45:22<br>NY_15674_JCY | NDA<br>CONFIDENTIAL<br>AGREEMENT<br>MUTUAL | GJC:_____<br>_____<br>_____<br>TRN:_____<br>_____<br>_____<br>LBY:_____<br>_____<br>_____ |
| | D:/Contracts/NDA_2<br>2018:12:05:09:24:10<br>NY_15674_JCY | NDA<br>AGREEMENT<br>NON-MUTUAL | KTH:_____<br>_____<br>_____<br>GJC:_____<br>_____<br>_____ |

REVIEW PAGE — 500

REVISION/ANNOTATION PAGE  600

602  604

MUTUAL NON-DISCLOSURE AGREEMENT
This Agreement is made and entered into as of the last date signed below (the "Effective Date") by and between _____, a _____ corporation having its principal place of business at _____ ("MyCompany") and _____, a _____ corporation whose principal mailing address is _____ (the "Second Party").

WHEREAS MyCompany and the Second Party (the "Parties") have an interest in participating in discussions wherein either Party might share information with the other that the disclosing Party considers to be proprietary and confidential to itself ("Confidential Information"); and WHEREAS the Parties agree that Confidential Information a Party might include, but not be limited to that Party's: (1) plans, methods, and practices; (2) personnel, customers, and suppliers; (3) <u>inventions, processes, methods, products, patent publications, and other proprietary rights</u>; or (4) specifications, drawings, sketches, models, samples, tool, computer programs technical information or other related information;

NOW, THEREFORE, the Parties agree as follows:
Either Party may disclose Confidential Information to the

GJC
TRN

GJC:_____

TRN:_____

LBY:_____

DOCUMENT RETRIEVAL AND PROCESSING FROM ONLINE DATABASES USING THUMBNAIL IMAGE INDEXING BASED ON USER AND DATA TYPE

CROSS-REFERENCE TO RELATED APPLICATIONS

The present application is a Continuation in Part Application of U.S. patent application Ser. No. 17/064,137 filed Oct. 6, 2020, and which claims priority to U.S. Provisional Application No. 62/913,641, filed on Oct. 10, 2019 and entitled "Document Retrieval and Processing from Online Databases Using Thumbnail Image Indexing.".

TECHNICAL FIELD

Embodiments are directed generally to online databases, and more enhanced document review and editing of shared documents stored in online databases.

BACKGROUND

Many professional activities involve large-scale document review and analysis among members of a team. To accurately and efficiently review, edit, or comment on large quantities of documents for any project, many contributors may need to access, review, edit, approve, append key words or themes that summarize what a document discusses or relates to so a reviewer or team member can more easily sort, identify, and categorize similar documents in a data set (hereinafter, "coding"), and otherwise process multiple versions of documents within large data sets. Although some document sharing and versioning software is available to track contributions and changes from different team members, such present solutions are limited to specific programs (e.g., word processors, spreadsheets, etc.), or are simply inadequate for large-scale, data-intensive projects involving many people and large numbers of disparate documents. The currently available document sharing and versioning software is also slow and cumbersome.

Fields that require comprehensive document review processes by different numbers of people include law, architecture, engineering, medicine, accounting, and so on. In the field of law, for example, large scale document review and coding on big litigation projects requires intense use of databases, and in which current practices and products are slow and inefficient. For example, while documents are coded by review teams using key, terms that reflect what is contained in the document or what themes or concepts the document relates to, attorneys who need to see the documents and decide whether to rely on them and incorporate them into deposition preparation, motions, or briefs must enter a search into a large database based on codes, time periods, or custodians. The database then returns an index of all of the documents that are responsive to the search terms, but access to the actual documents is not provided. Separate operations, such as clicking on links in the index or other retrieval commands are required to actually pull up the document. This is clearly a slow and wasteful process.

Furthermore, when reviewing documents, attorneys or team members often make notes about why the document or a key portion of the document is important. Such notes are typically stored in a special link in the document, such as in the "attorney notes" section of the document's profile. While those notes may be visible in the index, typically one cannot see what is being referenced or written. Likewise, architects may need to review and edit plans and building specs, and doctors may need to jointly review medical records or x-rays. Many other similar team-based, document processing applications also exist.

What is needed, therefore, is a document review and processing system that provides users the ability to see and make notes on the documents and share the notes in real time across disparate computing platforms with multiple users participating simultaneously.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 4 illustrates an example search page that returns and displays thumbnail images of responsive documents, under some embodiments.

FIG. 5 illustrates the display of a thumbnail image and associated information for a retrieved document, under some embodiments.

FIG. 6 illustrates an example notation page, under some embodiments.

FIG. 7 illustrates the layout of a document review page showing only thumbnail images and associated keywords, under some embodiments.

DETAILED DESCRIPTION

Figure 1:
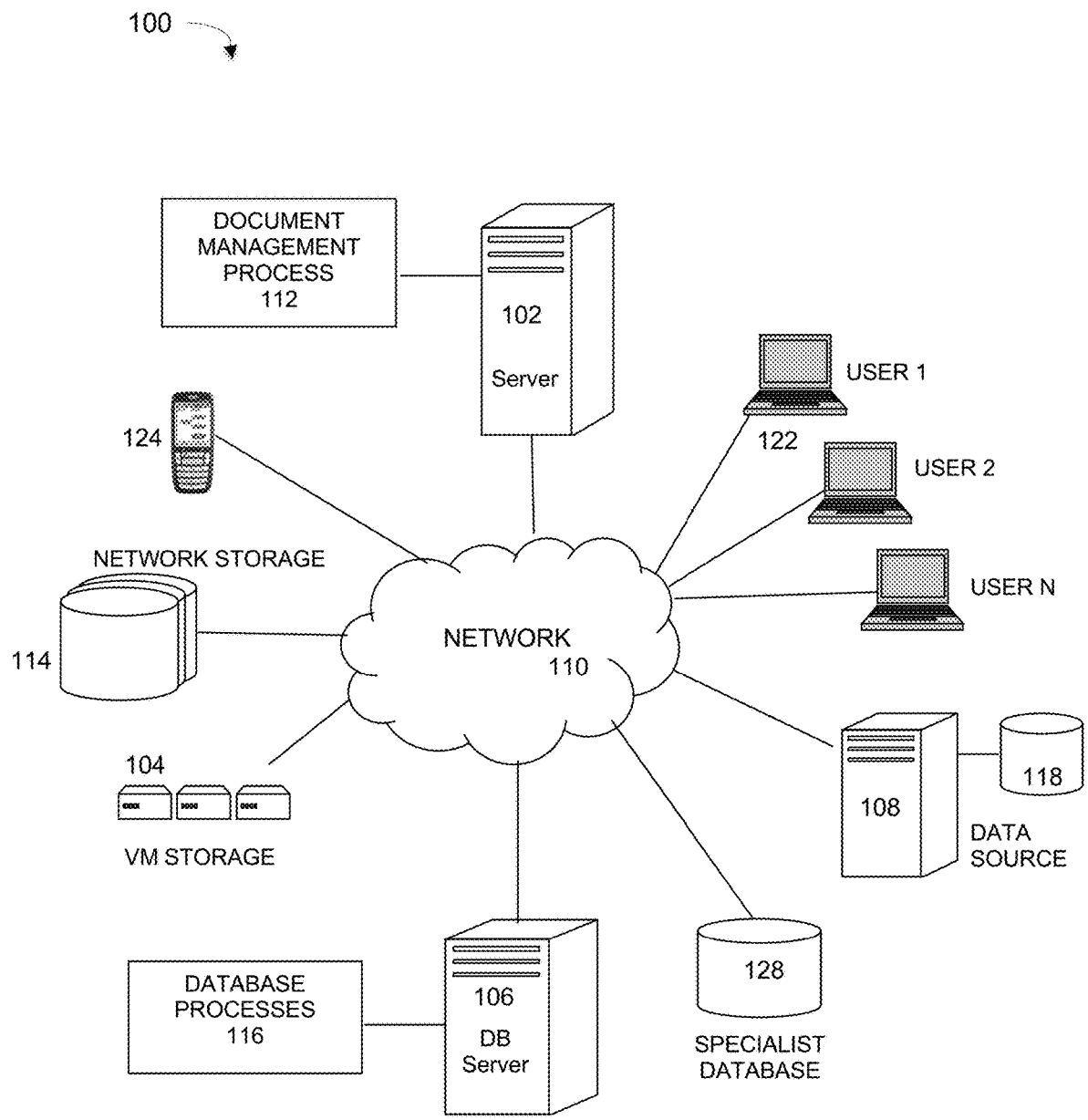
FIG. 1 illustrates a computer network system that implements one or more embodiments of a computer network implementing a comprehensive document sharing and review process, under some embodiments.

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer, tablet computer (e.g., Apple iPad, MS Surface Pro), or smart phones (collectively "computer"), such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the described embodiments.

Embodiments are directed to a process and system of implementing a comprehensive and real-time document sharing, editing, and processing platform using online databases. The system includes a data storage and retrieval process as well as a graphical user interface (GUI) component that displays small graphical representations of documents or file elements, referred to as "thumbnail" images to provide a quick recognizable reference to a document, as well as a link to the document or file itself.

FIG. 1 illustrates a computer network system that implements one or more embodiments of a computer network implementing a comprehensive document sharing and review process using thumbnail images as indexes, under some embodiments. In system 100, a server 102 executes a document management process 112 that coordinates or manages the access, retrieval, processing, and storage of files or documents stored in an online storage medium and accessible by multiple users located anywhere in the world. Data may be provided by one or more data sources 108 to storage devices, such as network storage 114, client storage 106, and/or virtual storage devices 104. With regard to virtual storage 114, any number of virtual machines (VMs) or groups of VMs (e.g., organized into virtual centers).

In a typical distributed network that may span many different offices or worksites throughout a country or even globally, any number (N) of users 122 may access the network. Each user accesses the network using an appropriate computer or communication device, such as a desktop computer, portable computer, tablet computer, smartphone, and so on. Each user may process or use the data within system 100 in different ways, such as authoring, reviewing, editing, cataloging, or simply just viewing the data. The document management process 112 manages the access to the documents for all of the users regardless of their roles relative to each other and the documents in the system.

In an embodiment, a user client device may also comprise any personal computing device 124 that has an interactive display screen, such as a mobile phone, smartphone, tablet computer, and so on. Examples include devices from Apple, Samsung, and Microsoft, such as a Microsoft Workbook. For this embodiment, the document management process 112 can be implemented so that it works on or with any current de operating system (OS) software, such as Microsoft, Apple iOS programming, Linux, AWS, or any other comparable software.

For purposes of this description, the term "document" refers generally to a data element that is generated and processed using any appropriate application program. It may represent a text document, a spreadsheet, an image file, an audio file, a video file, and so on. Collections of documents may be stored in files or directories as dictated by the operating system used by the computers of network 100.

The network server computers are coupled directly or indirectly to the network resources (nodes or computers) through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client storage, server storage (e.g., 118), or network storage 114, which may at least be partially implemented through storage device arrays, such as RAID components. The data sourced by the data source may be any appropriate data, such as database data that is part of a database management system, and the data may reside on one or more hard drives (e.g., 118) for the database(s) in a variety of formats. When accessible through network 110, such databases may be referred to as "online databases."

In an embodiment, a data source may be a specialist database 128 used by practitioners in a specific industry, such as law, medicine, real estate, engineering, finances, and so on. In the example of the U.S. legal profession, the database 128 may be a legal research data base (e.g., Lexis/Nexis, Westlaw, etc.), a court database (e.g., PACER), a government database (e.g., USPTO website, etc.), and so on. Such a database can be used for specific searches for cases, laws/statutes, patents, law review articles, and so on. Upon retrieving responsive documents from this database, process 112 can produce a thumbnail of the responsive document, which can then be shared in real-time with other relevant users, annotated, saved, and so on, as described below. The search terms could be highlighted in the returned cases/articles, and the image could be scrolled through to display specific pages or passages containing the highlighted term. For the medical field, database 128 could comprises AMA databases, medical journals, and so on.

Embodiments of the document management process 112 provide for enhanced and efficient review, commenting, and coding of documents stored in an online database. The method provides for user applications programs that interface with an online database and allow review of thumbnail pictures of documents, that have been searched for, in a grid-like array ("index") so that the reviewer can actually see the documents at issue, as opposed to arbitrary identifiers (e.g., document identification numbers) that do not provide the reviewer with any understanding of the text of the document.

Figure 2:
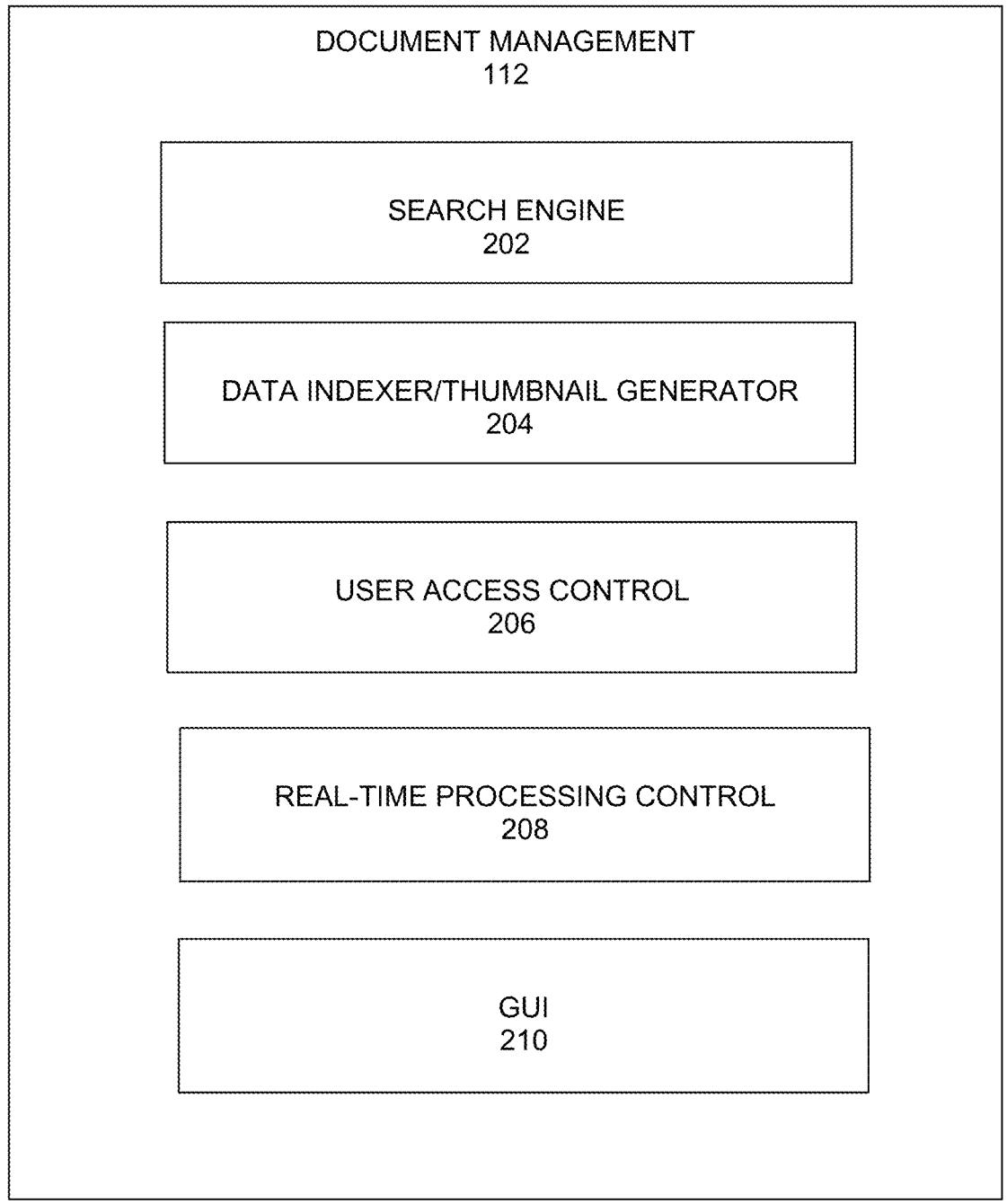
FIG. 2 is a block diagram illustrating certain functional components of a document management process or component, under some embodiments.

FIG. 2 is a block diagram illustrating certain functional components of document management process or component 112, under some embodiments. As shown in FIG. 2, the document management component 112 comprises a search engine 202 for the user to enter search terms to retrieve or access documents or files of interest. The search engine 202 may be a resident text-based search engine, or it may be an interface to a separate, standalone search engine or search application executed on the user client computer, a network server computer, or a cloud implemented program. A data indexer 204 indexes documents or files that contain or are otherwise responsive to the search parameters (terms, phrases, etc.) entered by the user. The retrieved documents are then indexed with an appropriate index that indicates their degree of match to the search parameters. Some documents may be more relevant to a search than others, such as by frequency of search term, location of search term, exactness of match, source of document, and so on. A hierarchical index helps order the retrieved documents for further processing or viewing by the user in a desired sequence.

In an embodiment, the indexer 204 also generates a thumbnail image of all or some of the relevant retrieved documents. These thumbnail images are displayed to the user through GUI 210. The thumbnail image can be a first page of a document, a main page of a document, an image contained in the document, or an amalgamation of elements of the document. The thumbnail image is configured to provide enough graphic content so that a user familiar with the document would be able to recognize the retrieved document just by seeing the thumbnail. The thumbnail image thus provides a robust means of user identification of a retrieved document as opposed to simply returning the index number or string, or the document file name.

The retrieved document or documents can be viewed, accessed, edited, highlighted, annotated, or otherwise processed by one or more other users 122. Thus, an aspect of the document management process 112 includes user access control to the data retrieved by the process. In an embodiment, a user access control component or process identifies users requesting access to a retrieved document to validate whether they are to be granted access and the degree of processing to which they are entitled. For example, access may be limited to users of a certain status in relation to the system administrator, searching user, or other authority. This status may be defined by company hierarchy, such as officer versus staff, manager versus worker, partner versus associate, and so on. It may also be defined on a project-basis, such as authors/creators, reviewers, contributors, implementors, and so on. The degree of processing may define an amount of processing a validated user may perform with respect to a document. For example some users may be limited to read-only or annotate only, while others may read and write, or create and delete documents, and so on.

Document management component 112 also includes a real-time processing control component 208. This component allows multiple users to simultaneously access a document and perform certain tasks in a manner in which changes to the document are visible to all of the other users with little or no time delay. For example, a team of users may annotate a document at the same time, and the notations made by each user would be displayed in real-time to all of the users. This provides much more timely interaction and instant feedback in contrast to the sequential procedure required in present programs in which a first user makes changes and then passes the document to a second user who adds his or her changes, and so on to other successive users. The GUI process 210 provides the interface to the user client computers to accept search terms, display the returned thumbnails, and accept and display notations, changes, and edits to the retrieved document.

By looking at thumbnails that can be expanded (even if the expansion is limited in size), the user (reviewer) can determine whether the document is the item being searched for, and whether it can or should be used for a particular purpose. For example, for a lawyer, the purpose may be use in a deposition preparation, brief, or as an exhibit. Through the GUI 120, when the user expands on a thumbnail in the index, notes can be input and viewed by the other users. This is provided in real time, since large cases may involve multiple reviewers or parties looking at documents in the database at the same time, often from different geographic locations. The real-time collaborative viewing aspect allows users to look at a document in an index from a search that anyone has just run, and then work as a group to go over the documents, marking them up as they expand the thumbnails or reviewing notes already entered on the thumbnails. This provides significant advantages over current programs that have never allowed and do not currently allow this kind of access to thumbnails and the ability to see and make notes on the documents and share the notes in real time cross the platform with multiple users participating at once.

Figure 3:
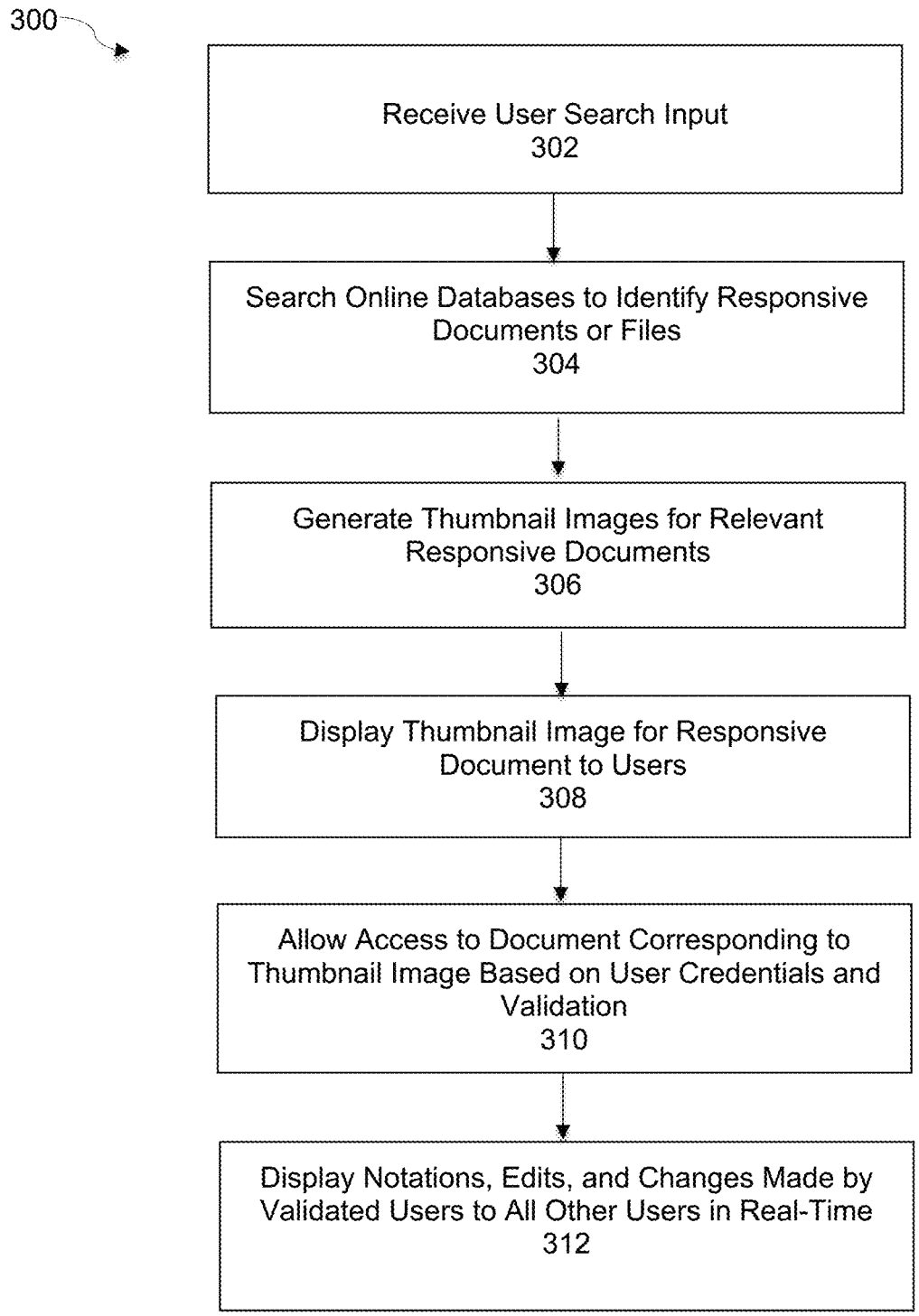
FIG. 3 is a flowchart that illustrates an overall process of providing document management using thumbnail images as indexes, under some embodiments.

FIG. 3 is a flowchart that illustrates an overall process of providing document management using thumbnail images as indexes, under some embodiments. Process 300 begins by the search engine 202 receiving search terms by a user to find a certain document or documents, step 302. The search term may be a specific file name, directory path, Web URL or other string that positively and uniquely identifies a specific document. Alternatively, it may be a key term or set of key terms that the user thinks will most likely identify a document. The search engine then searches all of the appropriate online databases to identify responsive documents or files, step 304. In an embodiment, a single document that most matches the search term or terms may be retrieved. Alternatively, the search engine may be configured to return a set of documents that include the search terms. The user may then select the desired document or documents from the retrieved set. The maximum number of returned documents may be set by the user, along with matching characteristics, as utilized by known search engine programs.

The process then generates thumbnail images for the retrieved document or documents, step 306. In an embodiment, this can be accomplished by taking a snapshot image of the document or the first page of a multi-page document. Alternatively, some intelligence may be used to ascertain a most identifiable view of the document, such as a representative figure, summary page, and so on. In any case, the thumbnail image should be an image that uniquely identifies the retrieved document to the searching user. Through the GUI, the thumbnail image is then displayed to the users who may desire access to the document, step 308. If a number of documents are responsive to the search, one thumbnail each may be displayed in an array. Depending on system constraints, these may be displayed in a sequential arrangement, overlapped tile arrangement, slide deck arrangement, or any other appropriate display.

Document relevance may be assigned to each document in a set of retrieved documents based on certain defined criteria. These may include frequency of search term occurrence, location of search terms, type of document, time of document, author, and so on. A system administrator or user may set the relevance criteria based on specific application requirements. Alternatively, certain known search engine algorithms may be used to determine and define the most or more relevant documents within a set of returned documents. The GUI may be configured to appropriately highlight or display the thumbnail images for most relevant documents in a distinctive manner to the users.

Once the thumbnail images have been displayed to the users, one or more of the users may choose to annotate, change, destroy, or otherwise process the corresponding document. The process first identifies and validates users based on access controls set by the system, system administrator or other authority, and allows access accordingly, step 310. Changes made to the document are then indicated on the thumbnail image directly, or other display area for viewing by the other users, step 312. In an embodiment, the real-time processing control component 208 displays any changes made by any validated user as they are made by that user in real-time on the displays of the other users.

In an embodiment, the thumbnail image is the relevant index item for a returned document. It also represents a graphical element that can be manipulated by the user to access the actual document itself, as well as a display area that stores notations made by a user so that they can be easily seen or referenced by other users.

FIG. 4 illustrates an example search page that returns and displays thumbnail images of responsive documents, under some embodiments. The example search page 400 has an input area 402 where the user can enter one or more search terms or search phrases. These can be the name of a document, key words in the document, general words that may find related documents, themes to be used in a deposition or at trial, or any similar search term as processed by a search engine. Depending on the specificity of the search term and the documents in the database or databases being searched, any practical number of documents may be retrieved. Since it is usually impractical to return all possible responsive documents, filtering algorithms may be used to limit the number of returned documents to a practical number, typically between one to five documents based on the degree of match. If only one document matches, such as a search for a specific name, only that document is retrieved. Depending on the application program that was used to create the document, certain metadata is associated with the document to encode characteristics such as the document name, location, type, size, creation date, last modified date, author, and so on. Some or all of these metadata items may be used by the search engine during the search process to find and retrieve the best matching document or documents. Once identified, the retrieved document is processed to generate a thumbnail image of the document or a representation of the document. For the example of FIG. 4, three possible documents were returned in response to a search as denoted Result 1, Result 2 and Result 3. Thumbnail sketches 404 were generated for each result and displayed along with relevant identifying information 406, such as file name or path showing where it is stored, time stamp information, or any other unique identifier that may be assigned to or created for the document.

In an embodiment, the thumbnail image is the first page of any document generated by any program that has been captured by a snapshot image to generate a displayable image file in compressed or uncompressed format, such as a PDF (Portable Document Format), JPEG, or GIF (Graphics Interchange Format) file, and so on. The thumbnail image also represents a link to the actual document so that the document can be accessed and retrieved from the data source using known user interface mechanisms.

The size of the thumbnail image can be dynamic depending on the number of documents returned for a search, the size of the client device screen, the amount of other information presented, and other relevant factors. For example, if only one document is returned, the thumbnail image may be sized relatively big on a standard computer monitor (e.g., 12" to 15"). Likewise, if multiple pages are returned, they may be sized small to fit on one page to prevent the need to scroll through multiple pages.

Other GUI mechanisms may also be provided to manipulate the thumbnail image. For example, a reviewer can expand the thumbnails either by double clicking on the thumbnail or by expanding the thumbnail be expanding the borders via mouse or stylus or using gesture control on a touchscreen; the thumbnail will expand but the grid-like array will remain visible so the reviewer can see the thumbnails of the remaining documents without moving from the home page/index of the documents. Other techniques, such as double tapping on the thumbnail in either its original or enlarged form can be used to allow the reviewer to scroll through the other pages within the document.

In an embodiment, accessing a document by clicking on its thumbnail image will cause the system to display certain information about the document, such as previous versions, coded terms, revision history, and so on. It can also open a notation area to allow users to annotate the document or make notes to be seen by other users. It can also open the application in its native application program.

FIG. 5 illustrates the display of a thumbnail image and associated information for a retrieved document, under some embodiments. The review page 500 illustrates an example of a display for a document that has been opened by the user. The example review page 502 contains several different fields including the thumbnail image 502, the document ID field that may specify the name, location, or other alphanumeric identifier of the document, and any coded or key terms assigned to or associated with the document. In many applications, documents may be coded so that they are cataloged according to defined terms and easily retrievable by entering a code. Examples include medical records and legal papers, such as litigation exhibits. The index will thus display any key terms that have been coded by the reviewer as well as the thumbnail picture of the document.

Once the thumbnail is expanded or double-clicked, the reviewer can highlight, comment, or notate on the thumbnails and save them as a new version without changing the original document; the reviewer can highlight, comment, or notate using a mouse, stylus, keyboard or finger depending on what the operating system and hardware allow. Thus, as shown in FIG. 5, a Notes area is provided for users (identified by their initials) to type in notes regarding the document. Alternatively, a text edit program (e.g., PDF editor) or native application editor may be used to notate directly on the document, where the notations or edits may be displayed in highlight (e.g., shade, underline, color, etc.) or in a manner provided by the program.

Depending on the device size constraints, the review page may be configured to display more than one returned document in different display areas 510 and 520. Thus, as shown in FIG. 5, two different returned documents denoted for two different searches or possibly the same search (denoted NDA_1 and NDA_2) are shown.

In an embodiment, previous versions 501 of the same document may also be displayed, such as behind the current version thumbnail image, as shown. The multiple versions of a document will be available via the thumbnails in the appropriate display area. The new versions will also show which reviewer created each new version of the document and when. The multiple versions will be evidenced by either offset framing behind the original thumbnail or by dots in the upper right-hand corner of the thumbnail. The number of versions of the document that have been created will be represented by either the number of offset frames or via the number of dots in the upper right-hand corner. When different versions of the documents are represented by the different frames behind the main thumbnail, as shown in FIG. 5, the reviewer can see the earlier version by clicking or touching the layered frame behind the current version. Alternatively, the reviewer could enter the version number in a search field, or, if the reviewer has entered the specific document number, then all versions will populate the review field. The reviewer can also slide his or her finger (or click and drag the pointer) to the right on the main thumbnail and the prior versions would fan out, similar to a hand of cards, so that they can be seen more clearly. Other similar visual mechanisms can also be used to display the different versions of a retrieved document.

In an embodiment, the document management component provides an interface and grid-like index as a live interchange with all users who are logged in to the server 102. The method will allow for all logged in users to review the same document(s) simultaneously and see all comments, notes, and highlighting from all other participating users at the same time. Thus all logged in users can enter their comments simultaneously, and each logged in viewer will see everyone else's work product in real time. This method this allows for collaboration, with multiple reviewers able to review and notate the same document in real time. The method also provides for a reviewer to cut and paste portions of the documents in the database directly into their own documents (e.g., briefs, memos, or deposition outlines), and the cut and pasted portions will have a link back to the database.

In an embodiment, the document may be opened by all users in its native format and edited directly using the program commands, or an editing overlay provided by process 112. FIG. 6 illustrates an example notation page, under some embodiments. As shown in FIG. 6, annotation page 600 includes a display area 602 for the document itself with a list of present reviewers and space for them to enter notes. Other information, such as document or user metadata may also be displayed as desired, such as to show the role and/or privileges associated with each present reviewer, document name and version, and so on. The notes section 604 allows each user space to type specific text messages about the document. In addition, or alternatively, the reviewers may make edits directly to the document when it is opened in its native format, such as shown by highlights, underlines, or other edit indicators, and each change may be identified back to the reviewer through name, initials, and so on. In an embodiment, the thumbnail image may be maintained as a snapshot graphics image (e.g., PDF or JPEG file), in which case, edit marks made on the thumbnail image may be entered through appropriate graphic editing programs or overlays.

The revision/annotation function and display can be modified or configured as needed. For example, the process can provide that all notes or comments on a document will show up in the margin with a line indicating the portion of the text to which the note or comment relates. If the note or comment is about the document as a whole, or does not apply to a particular portion of the text, then the note or comment will appear in either the upper or lower margin. If a version of a document contains highlighting, notes or comments, they will appear on a thumbnail once expanded. In the index, a thumbnail of a document that contains highlighting, notes, or comments will be identified by a symbol contained in the index's grid. In the thumbnail version, the additional reviewer comments will be notated with a flag, asterisk or symbol contained in the index alert the reader that the document contains reviewer notes.

The process 112 provides that the review of all documents in the database can be done by all members of a team simultaneously. In addition to providing for notes, comments, and highlighting, the method also provides that the reviewers can also apply tags or codes to the document from a pre-determined set of terms and codes, with real time updates and all those logged in can see the highlighting, coding and comments. Coding will be reflected in the index and will also be displayed next to the document if it is opened fully.

With respect to the GUI output, system 100 can also be used to create, or linked to, outlines for oral arguments, deposition outlines, witness prep notebooks, briefs, and other similar documents. Documents, with or without the comments of the users (at the users' discretion) can be dropped (via a thumbnail) into the text or linked to the text so that a person reading the text only has to click on the thumbnail or hypertext link to open the document.

Host attorneys and authorized users may wish to incorporate annotated or highlighted documents to deposition outlines, trial testimony questions, or briefs. Hyperlinking documents from the database into these mediums will increase efficiency and reduce costs, and also make it easier for questioning attorneys or courts to quickly view documents cited in support of a line of questioning or an argument, especially because the cited documents can be linked and can include highlighted text or notes, making it easier for the attorney to point out key portions of the document in support of an argument. For example, a trial team member can highlight key testimony or key sentences in an court opinion and save that highlighted version as a new version, which can then be dropped into a brief so a court can better see the highlighted sections in a hypertext link in a brief. For depositions or trial testimony, the attorney can drop a document or portion of a document into an outline, which when printed includes the document's text, including highlighting and comments, within the body of the outline. If the outline is stored electronically and will be used at trial on a computer or tablet, the outline can show a split screen, showing the outline of questions on one side of the screen and the highlighted and annotated document on the other side of the screen.

In an embodiment, the process 112 will auto-synchronize the documents selected and embedded in a final version or outline so that as new versions of the documents are created with notes, highlighting, or comments, the various versions of the documents can be printed out when an outline is printed out. The highlighted portions of the documents will also be sent with the outline, or opened with the outline, if e-mailed or if a different registered user opens up the outline. Only original documents without highlighting, notes, or comments can be shown to non-users. This is especially useful in the litigation context where a deposition outline may be marked up by various different attorneys.

With respect to versioning, the process can be configured to review a document's metadata to ensure that only the most recent version is captured to be included in the final set of documents. Again, in the legal context, this can mean that when creating an exhibit list for trial, hearing, depositions, or briefing, for example, the program will review the metadata to ensure that only the most recent version is included in a set of exhibits. The document selected will have no highlighting, notes, or comments unless an override is approved by an authorized user. Multiple copies of the same document and older versions of an original document will not be placed within an exhibit list unless an override is approved.

The method also allows for an authorized user to e-mail documents or otherwise transmit documents directly from the database with any highlights, comments, or notes if approved by an authorized user.

In an embodiment, the process 112 can be configured to store the revised or annotated versions in any desired way. For example, the process provides that each database will have separate folders so different versions and different documents can be viewed by authorized personnel, such as, in the legal context: the client's outside counsel attorney team, the client's in house counsel, the client's business team, retained experts, opposing counsel or the court. The method provides for the importation of documents from other (e.g., opposing) parties and other third parties to be stored in separate folders. These documents can be made part of the online database to be searched, retrieved, and processed as described above.

As shown in FIG. 5, documents may be coded or associated with certain defined key words or codes. In an embodiment, process 112 also provides that pre-determined keywords and search terms will be highlighted in the text for the set of documents to be reviewed by appropriate personnel (e.g., outside counsel) and for the separate folders approved by an authorized user. The highlighting can also be turned off for folders that are accessible to other than approved personnel. Highlighted search terms will be listed in the index next to the thumbnail of the document.

Through certain processes implemented by the real-time processing control element 208, process 112 can provide for a more efficient and logical method of deduplication, which will cut down on the number of documents to be reviewed. For example, methods such as artificial intelligence (AI) can be used to determine if two or more documents are identical even though they may be associated with different custodians. Based on the metadata, the original document will be reviewed, and any coding, notes, highlighting, and editing on the original document will be automatically added to the identical text housed by other custodians. Authorized reviewers can also allow for this functionality for documents that are less than 100% identical. This will cut down on search results returning many multiple copies. This functionality will ensure that all coding, highlighting, notes, or comments on the original document is automatically transferred to all copies in order to increase consistency across documents and reduce reviewer error. Similarly, the method provides that if one copy of a document is flagged as a possible exhibit, all copies are flagged as exhibits and are linked so that if a user selects one of the copies, the method will let the user know that there are multiple copies of the same document.

Process 112 can also incorporate predictive coding to assist with identifying possible documents for a specific purpose, such as using certain exhibits for depositions or trial. Using predictive coding, the database will predict or suggest which documents might be relevant for a particular witness. A user will enter key search terms or codes for a particular witness, and the method will select, on a percentage of the number of keywords or codes and create a thumbnail index of the selected documents. For example, the reviewer can enter key search terms and key coding themes, and will also be able to identify documents that should be part of the exhibit list, and then the AI engine can suggest which other documents, within a defined percentage probability, might be good for a particular witness.

This AI engine can also enable the search engine search through documents in the database designated for a witness and suggest documents that should be reviewed for a different witness with a similar profile. In this case, a user will enter a profile for each witness with key terms, descriptors, and coding, and the process allows AI to rely upon those profiles to populate possible exhibit lists in real time as reviewers review and code the documents in the dataset. The AI engine can select or suggest what other documents, within a stated percentage probability, might be good for a particular witness.

The process can also be configured to load in the key topics, search terms, or codes for certain types of actions, such as summary judgment or for an expert report, and the process will suggest documents that may be useful based upon a percentage of relevance. The method also provides for an easier process for coding documents based on pre-determined themes or key terms.

The AI engine in conjunction with predictive coding, can also be used to compare documents that are being reviewed in real time with other documents in the dataset so that documents with similar words and phrases, key search terms, or key custodians are assigned the same codes. This can be done in real time so that the database of unreviewed and uncoded documents decreases as documents are coded. This allows the process to cut down on coding time, and should also reduce inconsistencies among reviewers, where different reviewers may choose different coding terms due to different understanding of the same documents.

In an embodiment, process 112 can also be used in conjunction with some degree of human review. As desired, an authorized user can review the human-coded and reviewed set and compare those documents coded and selected via AI. The authorized user can add or delete codes and key words from a potential related set. This would function as a high level override, as needed, and allows the reviewers to edit or add notes, comments, and highlighting to the AI coded set. The process also provides that as new documents are input, the codes would automatically be applied to newly uploaded documents based upon a percentage similarity of search terms, words, or phrases.

As stated above, the users and reviewers of a document may comprise different people in an organization or in different organizations. They may have different roles in the organization, access privileges, goals with respect to the document, and so on. In general, users are typically organized in a formal or informal hierarchy with one user provided final approval power even though many other users can make contributions, such as by entering their own comments or codes. As for the hierarchy of reviewers and the impact of contradictory codes, each review set will have to have a lead designated, and that lead can designate substitutes for a set of documents or for a period of time. If contradictory codes are entered, or if someone de-selects a code, the team lead will receive: an indication e-mail message) as well as a notice when he or she logs into the system to resolve the conflict. The document will remain locked until the conflict is cleared. If the team (or multiple reviewers) are reviewing documents together, they will have to enter "group review" mode. In that mode, one reviewer must be designated as the one person who can make edits, highlight, notate or code a document. However, the other reviewers can see all highlights, notes, coding, and other edits in real time.

The process also streamlines the review of families of documents with attachments. The AI engine can be used to root out one set of documents with family members to be coded and reviewed, and then search for similar parent documents and similar attachments, even if those documents are free-standing. This process will note that the documents are similar to an identified family of documents and apply the same coding, notes, and comments to the same or similar phrases contained in the original set of documents.

Depending on the application field, certain documents are highly sensitive and subject to strict access rules, such as confidential medical records, classified government information, trade secret business data, and certain legal documents. Using the example of a legal case, the method allows for the protection of all privileged documents and all documents that may be subject to the work product doctrine. Authorized users will enter key names to be highlighted and flagged as attorneys. The AI engine will segregate all documents that contain, in whole or in part, or were sent to, copied (cc'd) to, or received from the entered names. With regard to privileged documents, the process also provides that attachments and families need to be reviewed by an authorized user before an entire family with attachments is deemed privileged. Once the authorized user manually reviews the document and all members of the family and either labels them privileged or agrees with the AI engine's pre-selection of the documents as privileged. The process will automatically flag any documents or attachment that is contained in a stand-alone version within the dataset as potentially privileged and will place them in a separate folder. The authorized user can then manually review the flagged documents to determine if the privilege still applies or if the privilege has been waived in some manner. This allows for an authorized user to manually override a designation of privilege. No document flagged as potentially privileged will be produced or made available to an unauthorized user until an authorized user manually approves of the document's production.

With further reference to the legal example, the method will allow for the generation of a privilege log for all documents manually confirmed as privileged. The process will generate a log containing the to/from/cc/date in the log and will identify the potential privilege. If the document is an e-mail, then the log will automatically capture the subject line of the e-mail in the privilege log. If the document is an excel spreadsheet or regular document, the log will capture the title of the spreadsheet or document as contained in the metadata. Possible privileges include attorney/client privilege, work product doctrine, trade secret information, and confidential business information. The method also allows for the identification of HIPAA (Health Insurance Portability and Accountability Act) protected information if desired on a case-by-case basis.

The process also provides for an authorized user to redact any content that is privileged within an otherwise non-privileged document. The redacted version will be stored as a new document. On the document index next to the thumbnail of the original document, the program will identify that a redacted version exists.

Although the GUI screen displays have been shown for various different configurations, embodiments are not so limited. Any appropriate layout of the thumbnail images and associated information and user notations is possible depending on system configuration and constraints. Aspects may also include customization options to allow administrators or users to define display fields and layouts. The display screens can also be customized or configured to suit various different client devices.

Figure 7:
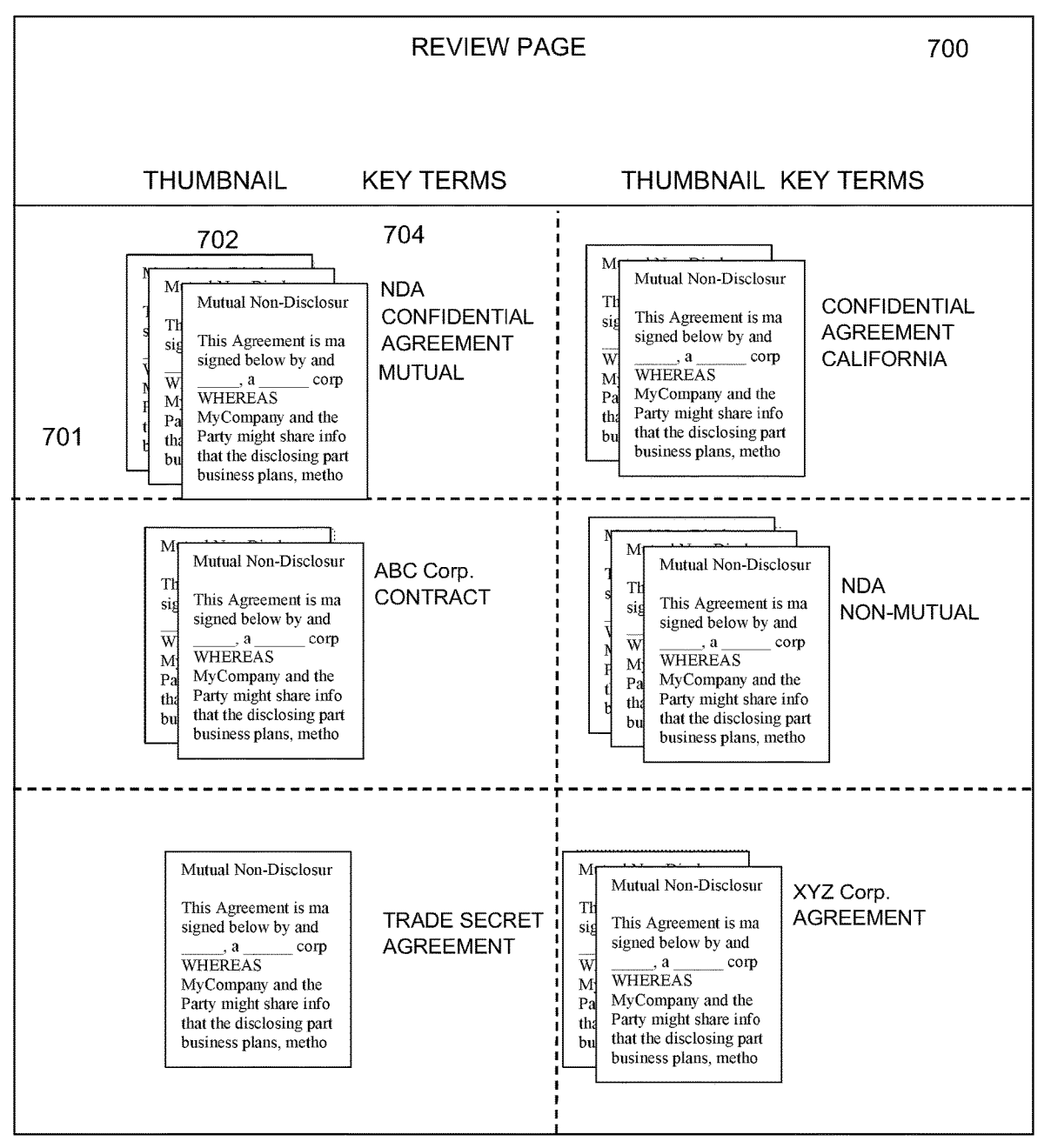

FIG. 7 illustrates the layout of a document review page showing only thumbnail images and associated keywords, under some embodiments. For the embodiment shown in FIG. 7, a single review page 700 can be divided into a number (e.g., six) of different display panels 701. Each display panel shows the thumbnail image 702 of a document, along with previous versions, if any, and the key terms or codes 704. Instead of the key terms, other information may be shown, such as document identifier, reviewer identities, and so on. The thumbnail image 702 is the key index, however, and typically must always be shown.

Figure 8:
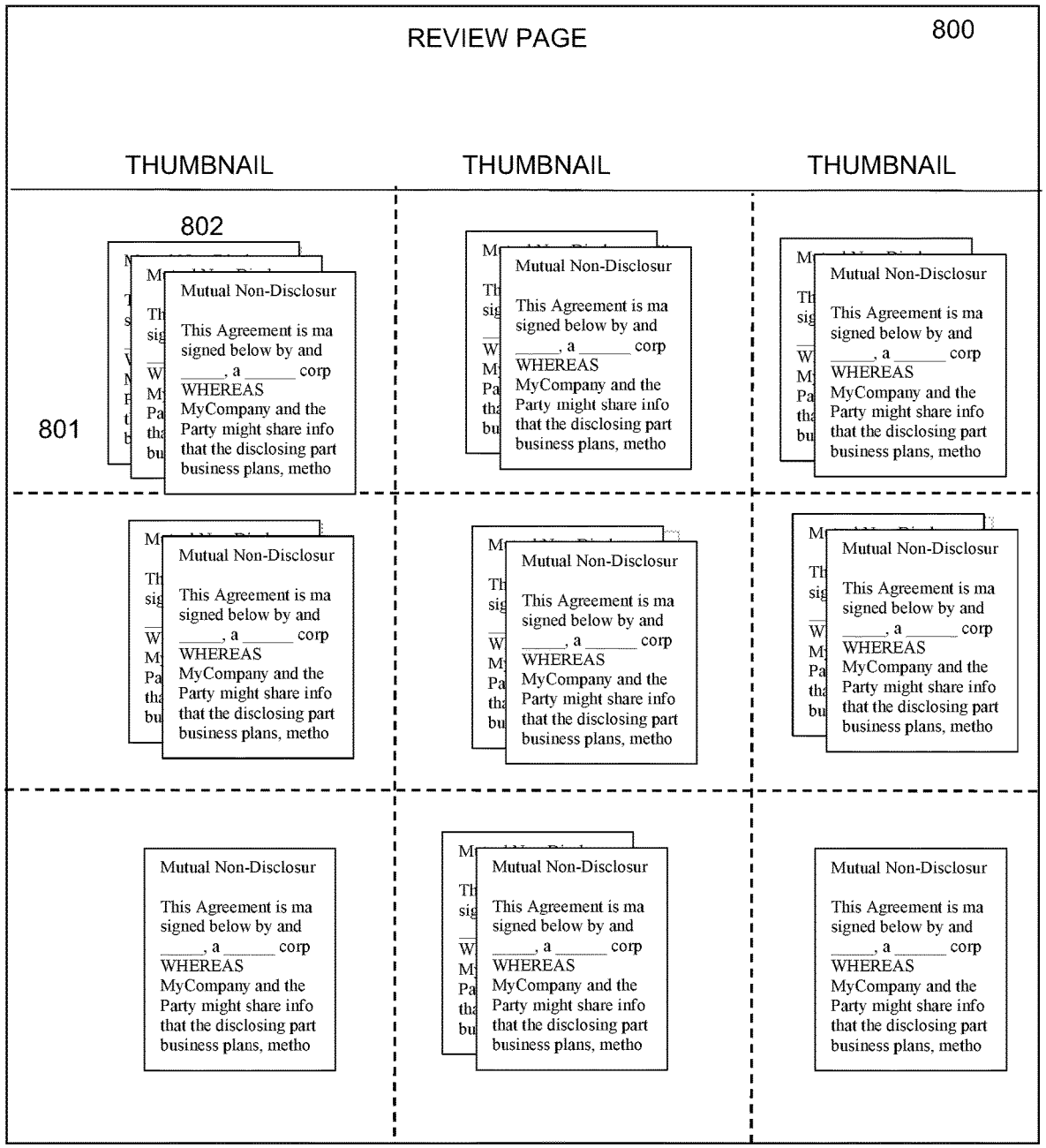
FIG. 8 illustrates the layout of a document review page showing only thumbnail images, under some embodiments.

FIG. 8 illustrates the layout of a document review page showing only thumbnail images, under some embodiments. As can be seen in FIG. 8, many documents can be shown in their own respective display panel 801 on a single display page 800 when only the thumbnail images 802 are shown. The display screens for the review pages of FIGS. 5, 7, and 8 are provided for examples only, and embodiments are not so limited. Any layout and arrangement of graphical images and associated text data may be used depending on the system constraints and configurations.

User/Document-Based Processing

As described above, multiple users and types of users can be given access to the document data set. Each approved user can have limited access depending on their respective roles. In the context of a legal proceeding, approved users could include outside counsel who are members of the trial team, in-house counsel, client personnel (e.g., business/technical people), testifying experts, consulting experts, opposing counsel, opposing experts, opposing party personnel, judges, clerks, arbitrators, and so on. Many different types of accessing users may be defined depending on the proceeding, data source, and so on. Typically, such distinctions result from Protective Orders, which provide for Confidential, Attorneys' Eyes Only, and, in cases of trade secret and patent infringement cases, Confidential and Ultra-Confidential designations. In addition, because of the structure of the Federal Rules of Civil Procedure, the trial team can provide access to documents to consulting experts and not allow access to the actual testifying experts.

Figure 9:
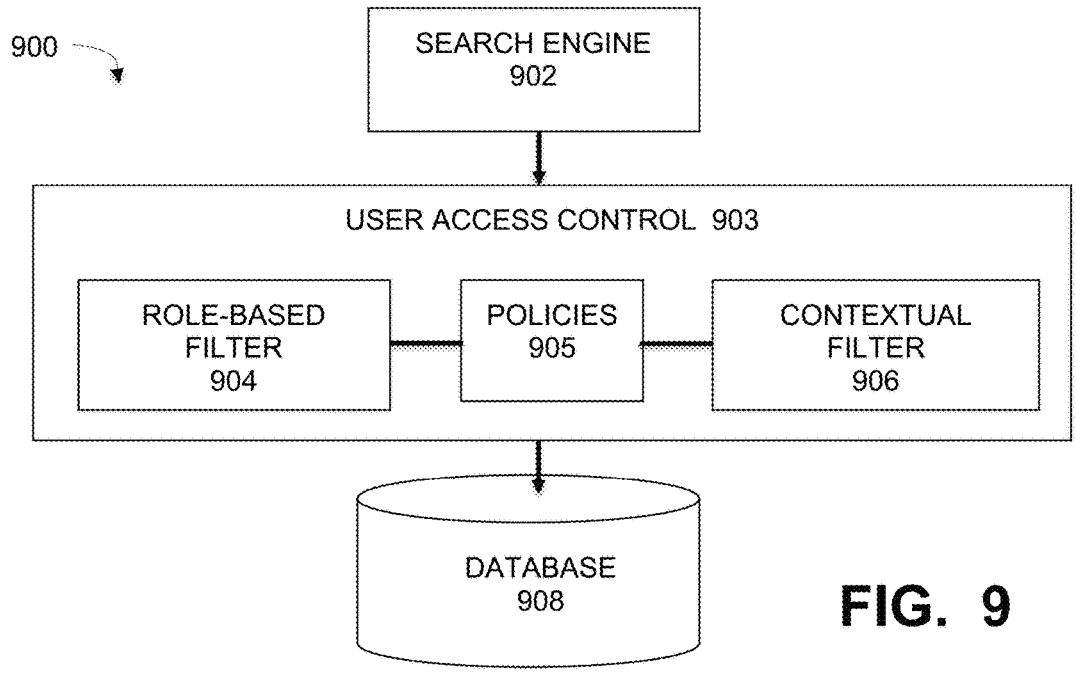
FIG. 9 illustrates a document access control system that provides access to database data based on certain roles and contexts, under some embodiments.

FIG. 9 illustrates a document access control system 900 that provides access to database data based on certain roles and contexts, under some embodiments. As shown in FIG. 9, a search engine component 902 is used to access one or more databases 908. Such a database can store sensitive or restricted information as well as publicly available information. As such, access to the data is controlled, such as through a user access control component 903, which may be embodied at least in part by user access control element 206 of FIG. 2. For this embodiment, the user access control component 903 includes one or more filters, such as role-based filter 904 and contextual filter 906, that each apply one or more access policies defined by the administrative user or system default settings. The user access control 903 receives a query or access request from search engine 902 and checks the identity of the querying user against the filters to determine whether or not the user should be granted access to database 908.

The role-based filter 904 can restrict access to people based on RBAC rules or defined policies that dictate which users within an organization or group of users can access the data based on their assigned traditional or special purpose roles. For example, lead outside counsel, in-house counsel, and CEO/COO/CTO level executives may be given free access to all of the data, while other personnel, such as associate attorneys, paralegals, engineers, and so on may be given access to only some of the information, and so on.

The contextual filter 906 can restrict access to people based on specially defined contexts, such as temporary access based on function, status, identity and so on. For example, a trial team may allow consulting experts see certain documents while limiting access to testifying experts. In addition, the trial team can even allow consulting experts to see documents that have been annotated, as well as different versions of saved documents, and only allow testifying experts to see the clean or unannotated versions of documents. For ease in exchanging documents, parties may also allow certain documents to be viewed by opposing counsel and opposing experts, which can help reduce costs and increase the speed and efficiency of discovery.

In another example, such as in the course of a merger or acquisition, the seller may be required to set up a data room to allow review of key documents relevant to the transaction, however, certain antitrust or intellectual property rules may prevent a purchaser from seeing all competitively sensitive information prior to closing. As a result, a "dean team" of the purchaser can be designated to review documents that counsel or general business people from the purchaser cannot see. Each such 'contextual' user will be assigned viewing privileges based on their role or function and a determination by counsel as to what types of information, including which version of annotated documents, can be viewed and by whom. The context as defined by policies 905 can thus define various different characteristics, such as user identity, role/function, type of data accessed, amount of time permitted for access, data copy/move rights, and so on. Typically, the context generally comprises a use of the document by the requesting user.

As described above, attorneys who host the document sets are able to code and make notes on the documents. These annotated and coded documents are saved as separate versions. The host attorneys can designate which approved users get to see which versions of the documents are seen by which approved users. This allows the host attorneys to protect privileged information from being disclosed to opposing counsel or to testifying experts.

With respect to revision and annotation rights, embodiments can also be used for compartmentalizing the searches or edits among different members of a group of users, such as a trial team. For example, experts should only be allowed to see documents that the trial team wants to let the expert see. Further, if the trial team has commented on documents, and that are saved in real-time and as a new version as described above, the experts can be allowed to see the "clean" documents without the lawyer's comments so that the privilege on those comments is not waived.

Similarly, in the area of a corporate transactions (e.g., Mergers and Acquisitions), the host attorneys can determine what documents can be available to the opposing party's "clean team" and which categories of documents can be made available opposing counsel or to the opposing business people. The negotiating team may want to comment on drafts or documents, but keep the client from seeing the comments or the documents produced by the other side in a virtual data room. This may occur if the transaction involves competitors, and there needs to be a client clean team to review and comment on competitively sensitive information, but not all employees at the client can see that information. To the extent a merger or acquisition is subject to FTC or DOJ scrutiny through a Second Request, the deal team and antitrust team can review materials, highlight them, comment on them, and embed them in presentations, white papers, or expert reports in the same manner as described above with regard to litigation.

With respect to document interaction, various different viewing windows may be provided in which the approved parties can make notes on the thumbnails, which will be saved as new versions, and which will only be available to be seen by the approved party's team. For example, a clean team member can make notes on a document and such notes can only be seen by members of the clean team and those authorized to see the clean team's notes. Similarly, if a consulting expert makes notes on a document, those notes are saved as a new version, and that version can only be seen by the consulting expert, the trial team, and the client, but not by the testifying expert unless specific permission is granted by the lead host attorney.

System 900 thus allows the host attorney to create limited viewing privileges that will help increase efficiencies and reduce costs, because one data set can be used by multiple parties, increase communication within approved groups, and still provide protection for privileged communications and/or protection for inadvertent disclosure of competitively sensitive information.

Authorized users on a team or as defined by policies 905 can each have the ability to drop documents into deposition question outlines, trial testimony, or briefs. By allowing all or some members of a team to have access, the team can experience efficiencies and reduce costs. Moreover, dropping or embedding a document, with or without highlighting or comments, can be done in real-time so the team can review and decide whether to include the document in the testimony or brief. Furthermore, because versions with highlighting and comments can be embedded, the team can determine whether to embed a document with highlighting or comments, and if so, which highlighting and comments should be included, all of which can be determined in real time.

Other groups or teams of authorized users can also be given the embedding capability. For example a testifying expert's team will have the ability to link and embed documents, with or without highlighting or comments they have created, within a report. Attorneys in a merger or acquisition can also link or embed documents, with or without comments or highlighting, in board presentations, memos, or shareholder presentations. The ability to include different versions by different groups of authorized users will increase all parties' ability to communicate key terms and arguments to clients, courts, and experts.

Although embodiments have been described with respect to certain examples in the field of law and legal documents, it should be noted that embodiments may be used in any industry or application in which files from databases are accessed and used by different people in an organization or organizations. As stated previously, example industries include medical, architecture, engineering, government services, education, and so on. In these cases, certain aspects related to legal issues and documents may also apply to these industries, such as hierarchies of reviewers, sensitivity and protection of documents, timeliness of review and finalization, adherence to professional requirements, and so on.

For example, embodiments may be used by architects in reviewing and editing plans and building specs, doctors jointly reviewing medical records or x-rays, accountants reviewing ledgers, financial records, or tax returns, government officials reviewing proposals, engineers reviewing drawings, specifications, and so on. Many such applications also include records/documents (e.g., medical records, spreadsheets, blueprints, etc.) that may be subject to legal proceedings, especially involving experts. However, such applications may not involve legal aspects, but may still implement embodiments of the system as herein described. For example doctors searching medical records and then getting online and collaborating and reviewing medical records either for research or for diagnosis purposes, or accountants wanting to search a company's financial records as part of a year-end reporting process or audit, and other similar ers/proceedings, may also use the document access control system 100.

Figure 10:
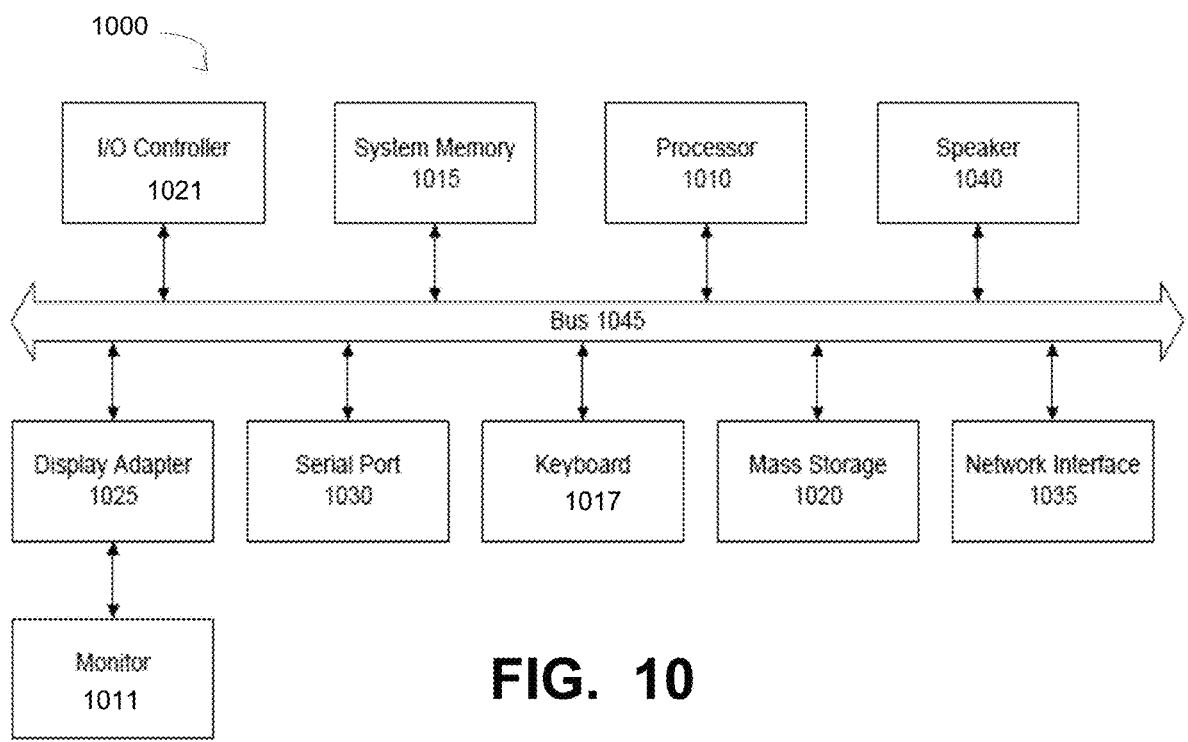
FIG. 10 is a block diagram of a computer system used to execute one or more software components of a document management process, under some embodiments.

As described above, in an embodiment, system 100 includes a programmatic blockchain creation functions that may be implemented as a computer implemented software processes, or as hardware components, such as may be embodied in the nodes and resources of the system. As such, it may be an executable module executed by the one or more computers in the network, or it may be embodied as a hardware component or circuit provided in the system. The network environment of FIG. 1 may comprise any number of individual client-server networks coupled over the Internet or similar large-scale network or portion thereof. Each node in the network(s) comprises a computing device capable of executing software code to perform the processing steps described herein. FIG. 10 is a block diagram of a computer system used to execute one or more software components of the nodes of FIG. 1. The computer system 1000 includes a monitor 1011, keyboard 1017, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

Embodiments as described herein may be applied to networks of any scale (full or partial), and may also be applied to any other physical, virtual or hybrid physical/virtual network, such as a very large-scale wide area network (WAN), metropolitan area network (MAN), or cloud-based network system. Aspects of the one or more embodiments described herein may be implemented on one or more computers executing software instructions, and the computers may be networked in a client-server arrangement or similar distributed computer network. The network provides connectivity to the various systems, components, and resources, and may be implemented using protocols such as Transmission Control Protocol (TCP) and/or Internet Protocol (IP), well known in the relevant arts.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method for accessing and processing files stored in an online database, comprising:
   receiving a search input to a search engine from a user identifying a document to be retrieved;
   determining a defined role of the user and a context of the search input, wherein the defined role comprises a formal organizational role or function within an organization with respect to the document, and the context comprises a use of the document by the user;
   searching the online database to retrieve the document among other documents possibly responsive to the search input;
   determining whether or not the user is an authorized user who can access the retrieved document based on the defined role and context, and if so, returning the retrieved document from the search engine;
   generating a thumbnail image of the retrieved document to be displayed to the authorized user, wherein the thumbnail image comprises a scaled-down displayed version of the retrieved document that is dynamically sized depending on factors including the number of other documents possibly responsive to the search input, and a size of a user device screen;
   providing a link from the displayed thumbnail image to access the document in the online database; and
   providing a real-time interactive interface to allow the authorized user and other reviewing users to edit or annotate the document or thumbnail image or type notes referring to the document and simultaneously view edits, annotations and notes made by any of other reviewing users.

2. The method of claim 1 wherein the document comprises part of legal files and the online database comprises trial and legal proceeding documents, further wherein the document is used in the legal proceeding and subject to restricted use and access due to confidentiality and legal privilege rules, and further wherein the interactive interface produces an annotated document that is stored in a database having separate folders for different users authorized under the confidentiality and legal privilege rules, and yet further wherein the reviewing users are authorized under the confidentiality and legal privilege rules.

3. The method of claim 1 wherein the document is encoded with one or more defined key terms, and further comprising displaying the thumbnail image with the one or more key terms and an identifier of the document.

4. The method of claim 3 wherein the identifier comprises at least one of: a timestamp, a computer directory location of the document, or a unique random identifier.

5. The method of claim 1 wherein the edits or annotations are made to the document in a native application of the document.

6. The method of claim 1 wherein the thumbnail image comprises a snapshot image of a defined page of the document formatted in a compressed image format different from a native application of the document.

7. The method of claim 6 wherein the edits or annotations are made to the thumbnail image using editing software compatible with the compressed image format.

8. The method of claim 2 wherein the reviewing users have different access privileges with respect to the document, and wherein key terms encoded by the reviewing users are validated by an administrator.

9. The method of claim 1 wherein a respective thumbnail image is displayed for all versions of the document including previous versions with a most recent version displayed distinctly from the previous versions.

10. The method of claim 9 further comprising generating a final version of the document by incorporating comments and revisions from all reviewing users upon approval by an administrator.

11. The method of claim 1 wherein the reviewing users are coupled through an Internet network, and the database is stored in a network storage medium coupled to the network.

12. A system for accessing and processing files stored in an online database, comprising:
    a search engine executed by a hardware processing component, receiving a search input from a user identifying a document to be retrieved and searching the online database to retrieve the document;
    a user access control hardware component determining a defined role of the user and a context of the search input, wherein the defined role comprises a formal organizational role or function within an organization with respect to the document, and the context comprises a use of the document by the user, and further determining whether or not the user is an authorized user who can access the retrieved document based on the defined role and context, and if so, returning the retrieved document from the search engine;
    an image generator hardware component generating a thumbnail image of the retrieved document to be displayed to the authorized user and other reviewing users through a graphical user interface (GUI), wherein the thumbnail image comprises a scaled-down displayed version of the retrieved document that is dynamically sized depending on factors including the number of other documents possibly responsive to the search input, and a size of a user device screen, and further creating a thumbnail index for the retrieved document and documents related to the thumbnail index through keywords; and
    a real-time processing control element providing an interactive interface to allow the reviewing users to edit or annotate the document or thumbnail image or type notes referring to the document and simultaneously view edits, annotations and notes made by any of the other reviewing users.

13. The system of claim 12 wherein the document comprises part of legal files and the online database comprises trial and legal proceeding documents, further wherein the document is used in the legal proceeding and subject to restricted use and access due to confidentiality and legal privilege rules, and further wherein the interactive interface produces an annotated document that is stored in a database having separate folders for different users authorized under the confidentiality and legal privilege rules, and yet further wherein the reviewing users are authorized under the confidentiality and legal privilege rules.

14. The system of claim 13 wherein the document is encoded with one or more defined key terms, and the GUI displays the thumbnail image with the one or more key terms and an identifier of the document.

15. The system of claim 14 wherein the reviewing users have different access privileges with respect to the document, and the system further comprises a user access control component allowing key terms encoded by the reviewing users to be validated by an administrator.

16. The system of claim 14 wherein the edits or annotations are made to the document in a native application of the document, and further wherein the thumbnail image comprises a snapshot image of a defined page of the document formatted in a compressed image format different from a native application of the document.

17. The system of claim 16 wherein the edits or annotations are made to the thumbnail image using editing software compatible with the compressed image format.

18. The system of claim 13 wherein a respective thumbnail image is displayed for all versions of the document including previous versions with a most recent version displayed distinctly from the previous versions.

19. The system of claim 18 further comprising the real-time processing control element generating a final version of the document by incorporating comments and revisions from all reviewing users upon approval by an administrator.

20. The system of claim 13 wherein the identifier comprises at least one of: a timestamp, a computer directory location of the document, or a unique random identifier.

* * * * *